June 21, 1938. P. BOUCHER 2,121,682
FILLER ROD HOLDER
Filed June 23, 1936
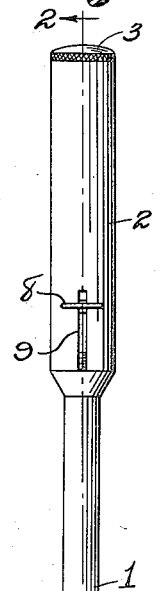
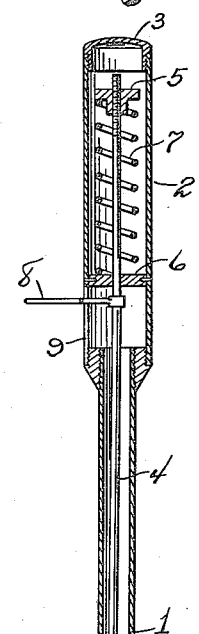
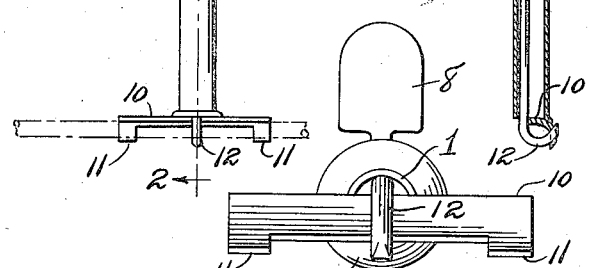
Parks Boucher INVENTOR
BY Victor J. Evans & Co.
ATTORNEYS Patented June 21, 1938

2,121,682

UNITED STATES PATENT OFFICE 2,121,682

FILLER ROD HOLDER

Parks Boucher, Antlers, Okla.

Application June 23, 1936, Serial No. 86,867

1 Claim. (Cl. 113—111)

This invention relates to filler rod holders employed in acetylene welding or if desired with slight changes may be successfully employed with electric welding and has for the primary object the provision of a simple and inexpensive device of this character which will permit an operator to easily and quickly pick up and use a filler rod with gloved hands and also permits scrap rods to be successfully used to a shorter length than heretofore, consequently reducing waste to a minimum.

With these and other objects in view, this invention consists in certain novel features of construction, combination and arrangement of parts to be hereinafter more fully described and claimed.

For a complete understanding of my invention, reference is to be had to the following description and accompanying drawing, in which—

Figure 1 is a side elevation illustrating a filler rod holder constructed in accordance with my invention.

Figure 2 is a sectional view taken on the line 2—2 of Figure 1.

Figure 3 is an end view showing the holder.

Referring in detail to the drawing, the numeral 1 indicates a rigid tube of any selected length and has secured to one end a sleeve 2 forming a handle. The end of the sleeve 2 is closed by a removable cap 3. A rod 4 extends through the tube 1 into the sleeve 2 and has threaded thereto an adjusting nut 5. A spring seat 6 is secured in the sleeve 2 and slidably supports the rod. A coil spring 7 is interposed between the nut 5 and the seat 6. A finger piece 8 extends through a slot 9 in the sleeve 2 and is secured to the rod.

Formed on the free end of the tube 1 is an elongated member 10 slightly curved transversely thereof and has formed on one edge and adjacent the ends thereof hook-shaped elements 11. The rod 4 extends out of the tube 1 past the member 10 and is bent to form a hook-shaped element 12 extending in an opposite direction to the hook-shaped elements 11 and cooperates therewith in gripping a rod holder employed in acetylene welding or electrical welding. The spring 7 normally acts to urge the rod 4 in a direction to cause the hook-shaped element 12 to bind the rod holder against the member 10 and the hook-shaped elements 11 thereof. To release the rod holder from this device it is only necessary to press upon the finger piece 8.

When employing this device in electric welding it is preferable that the sleeve 2 and finger piece 8 be constructed of some suitable insulating material.

Having described the invention, I claim:

A rod holder comprising an elongated tube, a hollow handle at one end of the tube, a stationary transversely curved jaw member secured to the other end of the tube and extending laterally of each side thereof and at right angles to the length of the tube, a plate fixed within said handle inwardly of the inner end thereof, an elongated rod extending longitudinally of the tube and slidable through said plate, a hook formed at one end of the rod and having the free end portion thereof engageable over an edge of said jaw member whereby to limit the inward movement of said rod, a spring in said handle engaging against said plate constantly urging said rod inwardly and longitudinally of the tube and handle, a spring tensioning nut threaded onto the inner end of said rod, and an operating member secured to the rod and projecting through the handle.

PARKS BOUCHER.